(12) United States Patent
Chen et al.

(10) Patent No.: US 12,510,635 B2
(45) Date of Patent: Dec. 30, 2025

(54) METHODS FOR DYNAMICALLY ADJUSTING THRESHOLD OF SiPM RECEIVER AND LASER RADAR, AND LASER RADAR

(71) Applicant: Hesai Technology Co., Ltd., Shanghai (CN)

(72) Inventors: Jie Chen, Shanghai (CN); Shaoqing Xiang, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 1049 days.

(21) Appl. No.: 17/553,066

(22) Filed: Dec. 16, 2021

(65) Prior Publication Data

US 2022/0120872 A1 Apr. 21, 2022

Related U.S. Application Data

(63) Continuation of application No. PCT/CN2020/102380, filed on Jul. 16, 2020.

(51) Int. Cl.
*G01S 7/4861* (2020.01)
*G01S 7/481* (2006.01)
*G01S 17/10* (2020.01)

(52) U.S. Cl.
CPC .......... *G01S 7/4861* (2013.01); *G01S 7/4815* (2013.01); *G01S 7/4816* (2013.01); *G01S 17/10* (2013.01)

(58) Field of Classification Search
CPC .................................................. G01S 7/4873
See application file for complete search history.

(56) References Cited

U.S. PATENT DOCUMENTS

| | | | |
|---|---|---|---|
| 2018/0259625 A1* | 9/2018 | Gnecchi | G01S 7/4873 |
| 2018/0284275 A1 | 10/2018 | LaChapelle | |
| 2018/0348141 A1* | 12/2018 | Hardman | G01J 1/44 |
| 2019/0101625 A1* | 4/2019 | Laplante | G01S 7/4814 |

FOREIGN PATENT DOCUMENTS

| | | |
|---|---|---|
| CN | 102621555 A | 8/2012 |
| CN | 104380064 A | 2/2015 |
| CN | 104389503 A | 3/2015 |
| CN | 104662440 A | 5/2015 |
| CN | 105656550 A | 6/2016 |
| CN | 105980885 A | 9/2016 |
| CN | 106706127 A | 5/2017 |
| CN | 107526096 A | 12/2017 |
| CN | 108027362 A | 5/2018 |
| CN | 108401444 A | 8/2018 |

(Continued)

OTHER PUBLICATIONS

PCT/CN2020/102380 International Search Report and Written Opinion (Translated) dated Sep. 28, 2020.

*Primary Examiner* — Thanh Luu
(74) *Attorney, Agent, or Firm* — Wilson Sonsini Goodrich & Rosati (57) ABSTRACT

Disclosed is a method for dynamically adjusting a threshold of a silicon photomultiplier (SiPM) receiver. The method includes: receiving incident light by a SiPM receiver (S101); obtaining an intensity of the incident light (S102); and adjusting a threshold of the SiPM receiver according to the intensity of the incident light (S103).

14 Claims, 5 Drawing Sheets

(56) References Cited

FOREIGN PATENT DOCUMENTS

| | | |
|---|---|---|
| CN | 108427109 A | 8/2018 |
| CN | 108567437 A | 9/2018 |
| CN | 109031249 A | 12/2018 |
| CN | 110568422 A | 12/2019 |
| CN | 110568422 B | 8/2022 |
| WO | WO-2021036567 A1 | 3/2021 |

* cited by examiner

METHODS FOR DYNAMICALLY ADJUSTING THRESHOLD OF SiPM RECEIVER AND LASER RADAR, AND LASER RADAR

CROSS-REFERENCE

This application is a Continuation Application of International Patent Application PCT/CN2020/102380, filed Jul. 16, 2020, which claims the benefit of Chinese Application No. CN 201910817891.2, filed on Aug. 30, 2019, each of which is entirely incorporated herein by reference.

TECHNICAL FIELD

This application generally relates to the field of photoelectric technologies, and in particular, to a method for dynamically adjusting a threshold of a silicon photomultiplier (SiPM) receiver, a method for dynamically adjusting a threshold of a laser radar, and a laser radar.

BACKGROUND

The laser radar (also referred to as a lidar) represents a generic term of sensor devices that make active detection by using laser. An operating principle of the laser radar is roughly described as follows: an emitter of the laser radar emits a laser beam, and the laser beam returns to a laser receiver due to backscattering after it encounters an object. A radar module can calculate the distance between the emitter and the object by multiplying a time interval between the transmitted signal and the received signal by the speed of light and then dividing the product by 2. Based on the quantity of laser beams, there are usually single-line laser radars, 4-line laser radars, 8/16/32/64-line laser radars, and so on. One or more laser beams are emitted at different angles in a vertical direction and scanned in a horizontal direction, thereby achieving the detection of a three-dimensional profile of a target area. A plurality of measurement channels (laser beams) are equivalent to scanning planes at a plurality of angles of tilt. Therefore, more laser beams in a vertical field of view lead to a higher angular resolution in the vertical direction and a higher density of the laser point cloud.

A laser receiver may use many types of components and parts to detect echoed waves, for example, an avalanche diode or a silicon photomultiplier (SiPM) receiver.

The content of "Background" is merely technologies known to the inventor, and does not represent the prior art in the relevant field.

SUMMARY

In view of at least one drawback in the prior art, the present disclosure provides a method for dynamically adjusting a threshold of a silicon photomultiplier (SiPM) receiver. The method comprises: receiving incident light by the SiPM receiver; obtaining an intensity of the incident light; and adjusting a threshold of the SiPM receiver according to the intensity of the incident light.

According to an aspect of the present disclosure, obtaining the intensity of the incident light comprises: counting, according to a current value of the threshold of the SiPM receiver, pulses generated by the incident light that are greater than the current value, and obtaining a count value of the incident light for representing the intensity of the incident light.

According to an aspect of the present disclosure, adjusting the threshold of the SiPM receiver comprises: proportionating an adjustment amount to a difference between the count value of the incident light and an optimal count value.

The present disclosure further provides a method for dynamically adjusting a threshold of a laser radar. The laser radar includes a plurality of SiPM receivers. The plurality of SiPM receivers are capable of sensing incident light at a plurality of angles. The method for dynamically adjusting a threshold comprises: receiving the incident light at a current angle by a SiPM receiver; obtaining an intensity of the incident light; adjusting a threshold of the SiPM receiver at a next angle according to the intensity of the incident light.

According to an aspect of the present disclosure, obtaining the intensity of the incident light comprises: counting pulses generated by the incident light that are greater than a current value by using the threshold of the SiPM receiver at the current angle, to obtain a count value of the incident light.

According to an aspect of the present disclosure, adjusting the threshold of the SiPM receiver at a next angle comprises: proportionating an adjustment amount to a difference between the count value of the incident light and an optimal count value.

According to an aspect of the present disclosure, the method for dynamically adjusting a threshold further comprises: forming a gray scale image according to the intensities of the incident light obtained by the plurality of SiPM receivers at the plurality of angles, where each pixel in the gray scale image corresponds to the intensity of the incident light obtained by one of the SiPM receivers at one of the angles.

According to an aspect of the present disclosure, the step of receiving the incident light at the current angle by the SiPM receiver is performed when the SiPM receiver is not ranging.

The present disclosure further provides a laser radar, comprising: a plurality of SiPM receivers, configured to receive incident light and generate electric pulses, where each SiPM receiver has a corresponding threshold; a signal processing device, coupled to the SiPM receiver, and configured to receive the electric pulse and output the electric pulse when the electric pulse is greater than the threshold of the SiPM receiver; and a control unit, coupled to the plurality of SiPM receivers, and configured to obtain an intensity of the incident light according to the electric pulse and adjust the threshold of the SiPM receiver according to the intensity of the incident light.

According to an aspect of the present disclosure, obtaining the intensity of the incident light by the control unit comprises: counting pulses generated by the incident light that are greater than a current value, to obtain a count value of the incident light.

According to an aspect of the present disclosure, the laser radar has a plurality of detection angles. Adjusting the threshold of the SiPM receiver by the control unit comprises: adjusting the threshold of the SiPM receiver at a next detection angle by proportionating an adjustment amount to a difference between the count value of the incident light and an optimal count value.

According to an aspect of the present disclosure, the control unit is configured to form a gray scale image according to the intensities of the incident light obtained by the plurality of SiPM receivers at the plurality of angles, where each pixel in the gray scale image corresponds to the intensity of the incident light obtained by one of the SiPM receivers at one of the angles.

According to an aspect of the present disclosure, the step of receiving the incident light at the current angle by the SiPM receiver is performed when the SiPM receiver is not ranging.

BRIEF DESCRIPTION OF THE DRAWINGS

The accompanying drawings forming a part of the present disclosure are used to provide further understanding of the present disclosure. Exemplary embodiments and description of the present disclosure are used to explain the present disclosure, and do not constitute an inappropriate limitation to the present disclosure. In the accompanying drawings.

DETAILED DESCRIPTION

Only some exemplary embodiments are briefly described below. As a person skilled in the art may understand, the described embodiments may be modified in various different ways without departing from the spirit or the scope of the present disclosure. Therefore, the accompanying drawings and the description are to be considered as essentially illustrative but not restrictive.

In the description of the present disclosure, it is to be understood that orientation or position relationships indicted by terms such as "center", "longitudinal", "transverse", "length", "width", "thickness", "upper", "lower", "front", "rear", "left", "right", "vertical", "horizontal", "top", "bottom", "interior", "exterior", "clockwise", and "counterclockwise" are based on orientation or position relationships shown in the drawings, are merely to facilitate the description of the present disclosure and simplify the description, instead of indicating or implying that the indicated apparatus or element needs to have particular orientations or be constructed and operated in particular orientations, and therefore cannot be construed as a limitation on the present disclosure. In addition, the terms "first" and "second" are merely used for descriptive purposes and are not to be construed as indicating or implying relative importance or implicitly indicating the number of technical features indicated. Therefore, features defined by "first" and "second" may explicitly or implicitly include one or more of the features. In the descriptions of the present disclosure, unless otherwise explicitly specified, "a plurality of" means two or more than two.

Exemplary embodiments of the present disclosure are described below in detail with reference to the accompanying drawings. It should be understood that the exemplary embodiments described herein are merely used to illustrate and explain the present disclosure but are not intended to limit the present disclosure.

In the descriptions of the present disclosure, it should be noted that, unless otherwise specified or defined, the terms such as "install", "couple", and "connect" should be understood in a broad sense, for example, the connection may be a fixed connection, a detachable connection, or an integral connection; or the connection may be a mechanical connection, or may be an electrical connection or communication with each other; or the connection may be a direct connection, an indirect connection through an intermediary, or internal communication between two components or mutual interaction relationship between two components. A person of ordinary skill in the art may understand specific meanings of the foregoing terms in the present disclosure according to specific situations.

In the present disclosure, unless otherwise explicitly stipulated and restricted, that a first feature is "above" or "under" a second feature may include that the first and second features are in direct contact, or may include that the first and second features are not in direct contact but in contact by using other features therebetween. In addition, that the first feature is "above", "over", or "on" the second feature may include that the first feature is directly above and obliquely above the second feature, or may merely indicate that the horizontal height of the first feature is higher than that of the second feature. That the first feature is "below", "under", or "beneath" the second feature includes that the first feature is right above and obliquely above the second feature, or merely indicates that a horizontal height of the first feature is lower than that of the second feature.

In a laser radar, various components and parts may be adopted as laser receivers to sense echo signals of the radar, for example, an avalanche diode or a silicon photomultiplier (SiPM) receiver. A basic structural unit of the SiPM receiver includes a single-photon avalanche diode (SPAD) having the single-photon detection capability and a quenching resistor connected in series. After the SiPM receiver receives photons, the photons excite electrons according to a certain probability and trigger an avalanche effect. A specific process of converting an optical signal to an electrical signal is as follows. When the photons enter the SPAD operating under a Geiger mode, a photoelectron is generated according to a certain probability. The photoelectron induces the avalanche effect in a depletion region to generate a constant electric pulse output. In this case, a pixel is in an activated state.

After the avalanche, the SPAD is in a quenched state, and other incident photons can no longer cause the avalanche effect. Therefore, each pixel can only provide information about "having" or "having no" photons. Since output ports are connected in parallel, the electric pulses outputted by each pixel are superposed to form a giant pulse. By measuring the electric quantity or amplitude of the giant pulse, the quantity of activated pixels can be calculated, so that the distribution characteristics of the incident photons are obtained by back-calculation, that is, echo characteristics.

Figure 1:
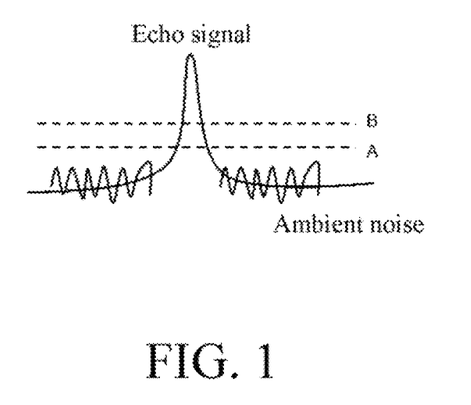
FIG. 1 illustrates a schematic diagram of an echo signal and ambient noise of a silicon photomultiplier (SiPM) receiver.

The SiPM receiver has a spectral response range from near ultraviolet to near infrared, a strong photon counting capability, and high sensitivity at the single photon level. When the SiPM receiver is used as a receiver of the laser radar, background light (the background light herein mainly refers to random noise caused by reflected light entering a receiver when ambient light illuminates an obstacle) in the case of using the SiPM receiver as the receiver may raise a noise floor outputted by the SiPM receiver. As illustrated in the schematic diagram of an echo in FIG. 1, if a threshold of a comparator is excessively low, a large quantity of noise pulses may enter other downstream devices (such as a time-to-digital converter (TDC)) configured to analyze signals and generate the echoes. However, the devices have limited processing capabilities, and in order to prevent a signal pulse from being masked by a large amount of noise, the threshold of the comparator may need to be raised.

In addition, it is also needed to control the threshold to be as low as possible, to increase the detection range. Moreover, different weather conditions or different target reflectivities may cause the noise floor levels or the amount of environmental noise to vary. Therefore, the performance of the method for dynamically adjusting a threshold can greatly affect the ranging performance of the laser radar.

Figure 2:
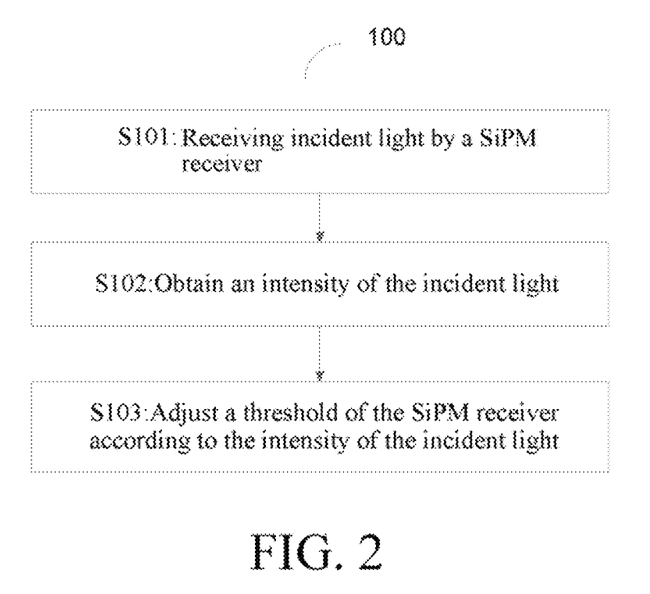
FIG. 2 illustrates a method for dynamically adjusting a threshold of a SiPM receiver according to an embodiment of the present disclosure.

FIG. 2 illustrates a method 100 for dynamically adjusting a threshold of a SiPM receiver according to an embodiment of the present disclosure. Details are described below with reference to FIG. 2.

Step S101: Receiving incident light by a SiPM receiver.

The incident light received by the SiPM receiver may be an echo signal (that is, a reflected laser signal returning to the SiPM receiver after a laser beam emitted by a laser emitter of the laser radar is reflected by an external object) of the laser radar. Alternatively, the received incident light may be the background light of an environment where the laser radar is located, for example, sunlight. Alternatively, the received incident light includes both the echo signal and the background light, which are all within the protection scope of the present disclosure.

Step S102: Obtaining an intensity of the incident light.

The intensity of the incident light may be represented by using various methods, for example, a current and/or an amplitude of the voltage, the quantity of pulses, or the like generated by the incident light. According to an embodiment, the intensity of the incident light may be represented by the quantity of the electric pulses generated by the incident light. Those skilled in the art can also conceive other ways of representing the intensity of the incident light, which are all within the protection scope of the present disclosure.

In addition, those skilled in the art understand that, the intensity of the incident light may be obtained from the electric pulse generated by the SiPM receiver, and may further be obtained in other ways. For example, the intensity of the incident light can be obtained from an additional photoelectric sensor designated for measuring the intensity of the incident light or the ambient light, which are all within the protection scope of the present disclosure.

Step S103: Adjusting a threshold Th of the SiPM receiver according to the intensity of the incident light.

The threshold Th of the SiPM receiver can be dynamically adjusted in step S103 according to the intensity of the incident light obtained in step S102. For example, when the intensity of the incident light is excessively high, for example, when the SiPM receiver is in a strong sunlight environment, the threshold Th of the SiPM receiver can be increased, to prevent the large quantity of noise pulses from entering downstream devices or circuits for analyzing the signals and generating the echoes. In this way, the signal pulses can be prevented from being masked by the large amount of noise. On the contrary, when the intensity of the incident light is relatively low, for example, during the detection by the SiPM receiver when there is no lighting at night, the threshold Th of the SiPM receiver can be decreased to guarantee that the normal echo signal is not filtered out and can enter the subsequent devices or circuits for analyzing the signals and generating the echoes.

After the threshold of the SiPM receiver is adjusted, the subsequent devices or circuits or software can use the adjusted threshold to filter a noise signal or a background light signal. For example, in the electric pulses generated by the SiPM receiver due to the incident light, the electric pulses whose amplitudes are equal to or greater than the adjusted threshold are identified as valid echo signals. The electric pulses whose amplitudes are less than the adjusted threshold are identified as the noise signals or the background light signals and directly filtered out. In this way, the signal-to-noise ratio of the laser radar can be increased, and the echo signals can be effectively analyzed, improving the accuracy and reliability of radar ranging.

The above method 100 can be performed continuously, so that the threshold of the SiPM receiver is dynamically adjusted to ensure that the threshold can be within a proper range. In addition, in the case of an array having a plurality of SiPM receivers, the thresholds of the plurality of SiPM receivers can be adjusted individually or collectively. For example, in the case of individual adjustment, steps S101, S102, and S103 are performed on each SiPM receiver. In the case of adjustment collectively, for example, the intensity of the incident light can be obtained by using one of the SiPM receivers to dynamically adjust the thresholds of all of the SiPM receivers. In the latter way, which uses the intensity of the incident light of one of the SiPM receivers to represent the intensity of the incident light of other SiPM receivers, albeit a lower accuracy, the processing speed is faster and the structure is simpler.

According to an embodiment of the present disclosure, the intensity of the incident light is represented by counting the pulses received by the SiPM receivers. An initial value can be set for each of the SiPM receivers, and the initial value can be any value. The initial value is used as a current value of the threshold. The pulses generated by the incident light are compared with the current value. The pulses greater than the current value of the threshold are counted to obtain a count value NoiseCount of the incident light (or referred to as a count value of intensity of the incident light). The count value of the incident light may be used for representing the intensity of the incident light.

Figure 3A:
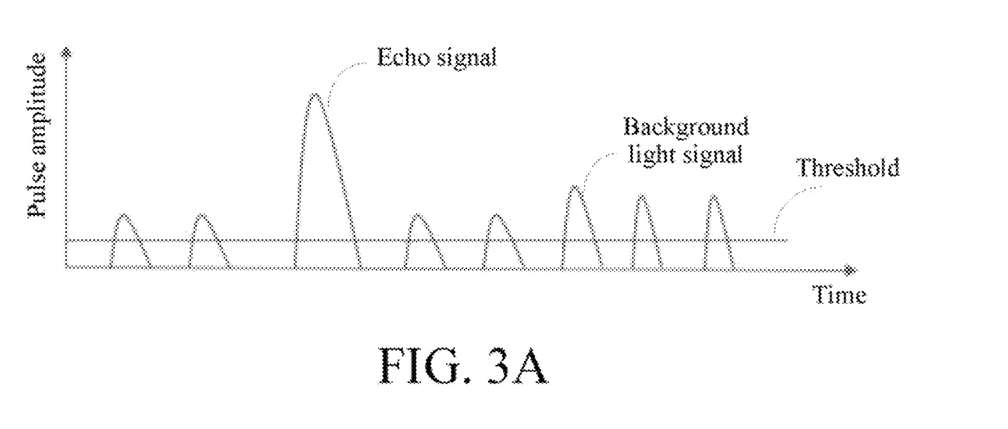
FIG. 3A and FIG. 3B illustrate a signal pulse generated by a SiPM receiver according to an embodiment of the present disclosure.

For example, as illustrated in FIG. 3A, the incident light received by the SiPM receiver includes both the echo signal of the laser radar and the background light signal. Within a time of flight (TOF), eight pulse signals are generated on the SiPM receiver by the incident light. One of the pulse signals corresponds to the echo signal of the laser radar. The other seven pulse signals correspond to the background light signals. The current value of the threshold of the SiPM receiver is described in FIG. 3A. The eight pulse signals are all greater than the current value of the threshold. The number 8 may be used as the count value NoiseCount of the incident light. Alternatively, the echo signal of the laser radar may be excluded, and the number 7 is used as the count value NoiseCount of the incident light to represent the intensity of the incident light. Those skilled in the art can adopt different solutions according to needs. The difference between the pulse signal generated by the background light and the pulse signal generated by the echoes can be determined by using an amplitude. Generally, the amplitude of the pulse signals generated by the echoes are higher than the pulse signals generated by the background light. Therefore, an echo signal threshold may be preset, and the pulses generated by the incident light are compared with the echo signal threshold. The pulse greater than the echo signal threshold is the echo pulse, and the pulse less than the echo signal threshold is the pulse generated by the background light. Those skilled in the art can also conceive other ways for determination.

Figure 3B:
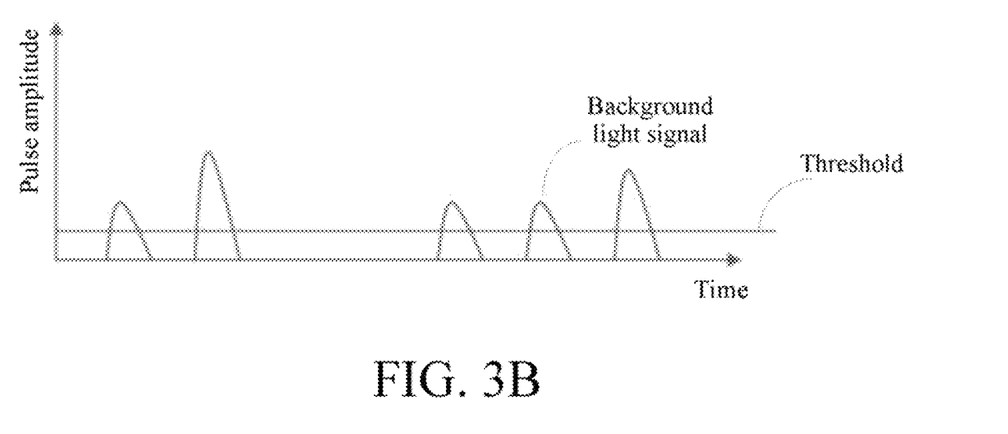

In the case illustrated in FIG. 3B, the incident light received by the SiPM receiver includes only the background light signal, and the quantity of the pulses greater than the current value of the threshold is five. Therefore, the number 5 is used as the count value NoiseCount of the incident light to represent the intensity of the incident light.

According to a preferred embodiment of the present disclosure, when the threshold of the SiPM receiver is adjusted, an adjustment amount ADJ is proportionated to a difference between the count value NoiseCount of the incident light and an optimal count value OptimumCount. In this way, adjacent measurement points can match the noise floor of a target. The optimal count value OptimumCount refers to a count value that can faithfully indicate the intensity of the background light. Those skilled in the art can set the optimal count value OptimumCount as required. When the threshold is set as a large value, the optimal count value represents a small count and a close range under the ambient light. When the threshold is set as a small value, the optimal count value represents a large count and excessive pulses of the ambient light. Therefore, it is appropriate to set an intermediate value determined by experiments. For example, the value may be set to 3. The adjustment amount ADJ is calculated by using the following formula 1:

$$ADJ \propto (\text{NoiseCount} - \text{OptimumCount}) \quad \text{(formula 1)}$$

In addition, those skilled in the art can easily understand that, the adjustment amount ADJ may be either positive or negative.

After the ADJ is obtained, the threshold of the SiPM receiver is further corrected by using the formula 2:

$$Th_{n+1} = Th_n + ADJ \quad \text{(formula 2)}$$

where $Th_n$ is the current value of the threshold of the SiPM receiver, and $Th_{n+1}$ is the corrected threshold of the SiPM receiver, for example, a threshold for determination in the next ranging process.

An emitting unit of a laser radar system may have a plurality of lasers to emit laser. The emitting unit having 64 lasers is used as an example for description below. A receiving unit of the laser radar has 64 SiPM receivers configured to receive echo signals, which are also referred to as 64 receiving channels. However, the quantity, arrangement, and pairing of the lasers and receivers can be selected and arranged as required, which are not limited in the present disclosure.

Figure 4:
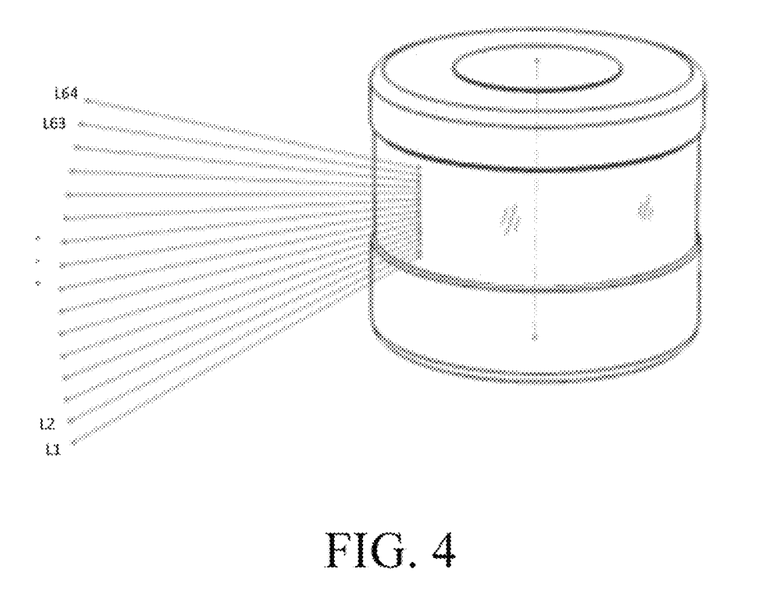
FIG. 4 illustrates a schematic diagram of a plurality of lasers arranged substantially in a vertical direction, for example.

The 64 lasers are substantially arranged in a vertical direction, for example, and emit laser beams to form a series of scanning lines. FIG. 4 illustrates emitted beams of at least part of the lasers. In this way, the scanning of the laser radar in the vertical direction is realized. The plurality of scanning lines form a scanning plane. After scanning is performed on one scanning plane, a rotor for the opto-mechanical system of the laser radar rotates at a certain angle (for example, 0.1 degrees) in a horizontal plane, to complete the scanning in the next scanning plane. The rotor for the opto-mechanical system continuously rotates to realize the scanning within 360 degrees in a horizontal direction.

Figure 5:
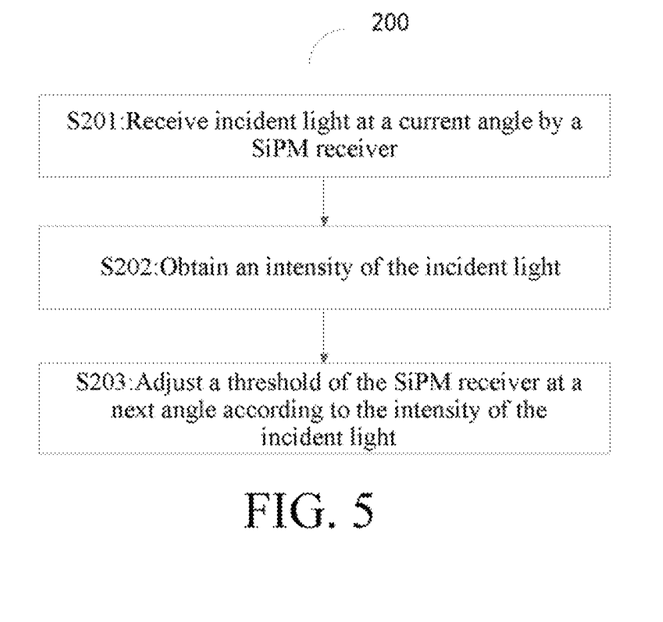
FIG. 5 illustrates a method for dynamically adjusting a threshold of a laser radar according to an embodiment of the present disclosure.

FIG. 5 illustrates a method 200 for dynamically adjusting a threshold of a laser radar according to an embodiment of the present disclosure. The laser radar includes, for example, a plurality of SiPM receivers. With the rotation of the laser radar or the opto-mechanical rotors thereof, each SiPM receiver is capable of sensing the incident light at a plurality of angles. For example, the SiPM receiver senses the incident light every 0.1 degrees in the horizontal direction, to realize the scanning within 360 degrees in the horizontal direction. The method 200 for dynamically adjusting a threshold is described with reference to FIG. 5 below.

Step S201: Receiving incident light at a current angle by a SiPM receiver.

At a current rotation angle of the laser radar, the incident light is received by one of the SiPM receivers. The received incident light may be an echo signal (that is, a reflected laser beam returning to the SiPM receiver after a laser beam emitted by a laser emitter of the laser radar is reflected by an external object) of the laser radar. Alternatively, the received incident light may be the background light of an environment where the laser radar is located, for example, sunlight. Alternatively, the received incident light includes both the echo signal and the background light.

Step S202: Obtaining an intensity of the incident light.

According to a preferred embodiment of the present disclosure, pulses generated by the incident light that are greater than the current value of the threshold may be counted by using a current value of a threshold of the SiPM receiver at the current angle, to obtain a count value of the incident light. For example, a table can be made for the 64 SiPM receivers of the laser radar, to record initial values of the threshold of 64 receiving channels. The initial values of the threshold may be any value. The threshold of each SiPM receiver may be obtained from the initial values of the threshold. The pulses generated by the incident light are compared with the current value. The pulses that are greater than the current value are counted to calculate the quantity of electric pulses, so as to obtain the count value NoiseCount of the incident light (or referred to as a count value of intensity of the incident light). The count value NoiseCount of the incident light may be used for representing the intensity of the incident light.

In addition, those skilled in the art understand that, the intensity of the incident light may be obtained from the electric pulse generated by the SiPM receiver, and may further be obtained in other ways. For example, a specialized photoelectric sensor may be disposed on the laser radar and is dedicated to the measurement of the intensity of the incident light or the background light. For all or part of the SiPM receivers on the laser radar, the intensity of the incident light measured by the specialized photoelectric sensor is used to adjust the thresholds of all or part of the SiPM receivers. Or, the intensity of the incident light measured by one of the plurality of SiPM receivers can be approximately used as the intensity of the incident light measured by other SiPM receivers, so as to perform subsequent adjustment to the thresholds.

Step S203: Adjusting a threshold of the SiPM receiver at a next angle according to the intensity of the incident light.

According to a preferred embodiment of the present disclosure, when the threshold of the SiPM receiver is adjusted, an adjustment amount is proportionated to a difference between the count value of the incident light and an optimal count value, as illustrated in the formula 1. A specific way for adjusting the threshold is illustrated in the formula 2.

After the threshold of the SiPM receiver is adjusted, the subsequent devices or circuits or software can use the adjusted threshold to filter a noise signal or the background light. For example, in the electric pulse generated by the SiPM receiver due to the incident light, the electric pulses whose amplitudes are equal to or greater than the adjusted threshold are identified as valid echo signals. The electric pulses whose amplitudes are less than the adjusted threshold are identified as the noise signals or background light signals and directly filtered out.

The above method 200 can be performed continuously, so that the threshold of the SiPM receiver is dynamically adjusted to ensure that the threshold can be within a proper range. In addition, the laser radar has a plurality of SiPM receivers. The thresholds of the plurality of SiPM receivers can be adjusted individually or collectively. For example, in the case of individual adjustment, steps S201, S202, and S203 are performed on each SiPM receiver. In the case of adjustment collectively, for example, the intensity of the incident light can be obtained by using one of the SiPM receivers to dynamically adjust the thresholds of all of the SiPM receivers. In the latter way, which uses the intensity of the incident light of one of the SiPM receiver to represent the intensity of the incident light of other SiPM receivers, albeit a lower accuracy, the processing speed is faster and the structure is simpler.

Figure 6:
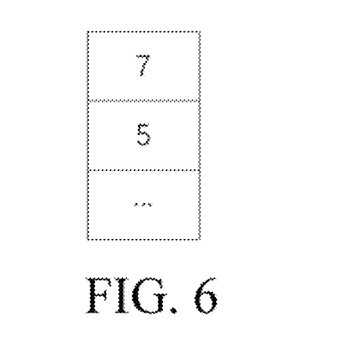
FIG. 6 illustrates a gray scale image formed by a plurality of SiPM receivers.

In addition, according to a preferred embodiment of the present disclosure, a gray scale image may be formed according to the intensities of the incident light obtained by the plurality of SiPM receivers at the plurality of angles. Each pixel in the gray scale image corresponds to the intensity of the incident light obtained by one of the SiPM receivers at one of the angles. For example, a value representing the intensity of the incident light obtained by one of the SiPM receivers is 7 (as illustrated in FIG. 3A, excluding the echo signal). A value representing the intensity of the incident light obtained by another SiPM receiver is 5 (as illustrated in FIG. 3B). Then, the gray scale image can be formed according to Noisecount of the above two SiPM receivers, as illustrated in FIG. 6. Finally, the 64 receiving channels can form a column of the gray scale image of a complete field of view. With the rotation of the laser radar, gray scale data can generate a two-dimensional diagram from one column, thereby generating a gray scale video synchronized with a rotation frequency.

In addition, according to an embodiment of the present disclosure, the method 200 further includes using the adjusted threshold as the threshold corresponding to the SiPM receiver at the next angle. For example, when the current angle is 0 degrees, the threshold of the SiPM receiver is adjusted according to the intensity of the incident light. The laser radar subsequently rotates to the next angle of 0.1 degrees, and then the previously adjusted threshold is to be used as a determination threshold at the next angle. In this cycle, the threshold of the SiPM receiver can be continuously and dynamically corrected. This is very advantageous in some cases. For example, in a case that the laser radar is in shadow on one side and sunlight on the other side, the method can effectively adjust the threshold.

In addition, according to an embodiment of the present disclosure, the execution timing of step S201 can be selected to measure the background light more accurately. For example, when one of SiPM receivers is not ranging within the TOF, the incident light at the current angle is received by the SiPM receiver. In this way, it can be ensured that the pulse signals generated by the SiPM receiver exclude the echo signal or include as few echo signals as possible.

Figure 7:
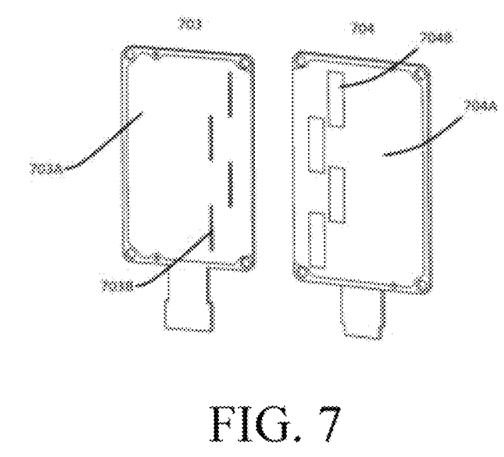
FIG. 7 illustrates a schematic diagram of an emitting unit and a receiving unit of a laser radar.

In addition to linear arrangement of the SiPM receivers, according to an embodiment of the present disclosure, the lasers and the SiPM receivers of the laser radar may be arranged in other ways. As illustrated in FIG. 7, four sets of emission light sources (lasers) 703B are disposed on an emitting circuit board 703A of the laser radar. The four sets of the emission light sources 703B are arranged in a staggered manner in the vertical direction. FIG. 7 also illustrates four sets of photoelectric sensing elements 704B disposed on a receiving circuit board 704A of the laser radar, for example, SiPM receivers. Preferably, the four sets of the photoelectric sensing elements 704B are arranged in a staggered manner in the vertical direction.

During actual scanning of the laser radar, for a column of the scanning lines, areas corresponding to echoes received by 64 SiPM receivers may correspond to different background light environments. For example, the echoes received by 1-3 receivers correspond to a scanning area having strong background light, and 5-8 receivers correspond to relatively weak background light. That is to say, more noise is generated when the background light is strong, and the threshold of the channel in the next scanning plane is correspondingly increased. When the background light is weak, the threshold of the channel corresponding to the next scanning plane is to be decreased. In addition, the gray scale image is formed according to Noisecount of the above two SiPM units, as illustrated in FIG. 6. Finally, the 64 channels can form a column of the gray scale image of a complete field of view. With the rotation of the laser radar, gray scale data can generate a diagram from one column, thereby generating a gray scale video synchronized with a rotation frequency.

Figure 8:
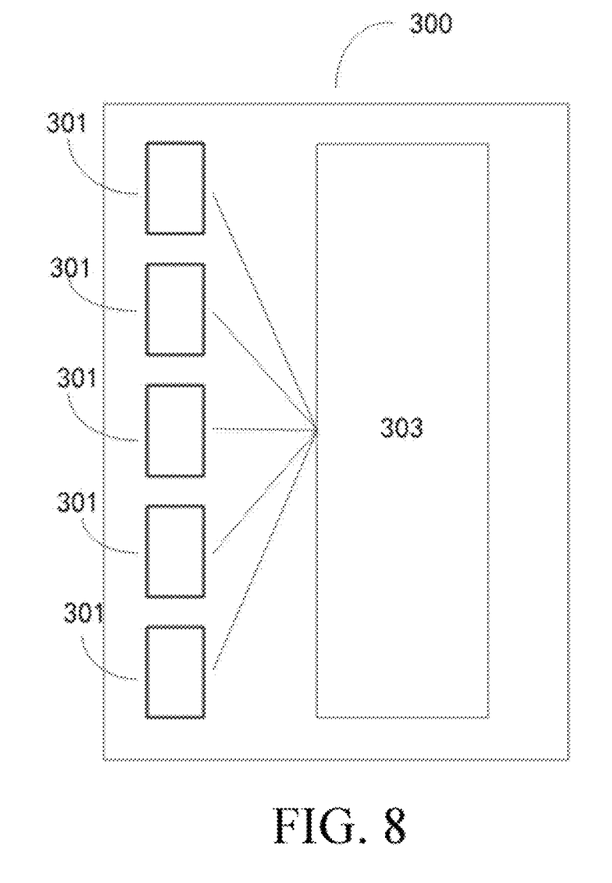
FIG. 8 illustrates a laser radar according to an embodiment of the present disclosure.

As illustrated in FIG. 8, the present disclosure further provides a laser radar 300. The laser radar includes a plurality of SiPM receivers 301 and a control unit 303. The SiPM receivers may receive incident light and generate electric pulses. Each SiPM receiver has a corresponding threshold. An initial value of the threshold is, for example, fixedly stored in an internal memory of the laser radar. The control unit 303 is coupled to the plurality of SiPM receivers 301, and may obtain an intensity of the incident light according to the electric pulse and adjust the threshold of the SiPM receiver according to the intensity of the incident light. In addition, those skilled in the art understand that, the control unit 303 and the SiPM receiver 301 may be directly connected or indirectly connected by other circuits or devices, which are all within the protection scope of the present disclosure.

According to an embodiment of the present disclosure, the laser radar further includes a signal processing device. The signal processing device is coupled to the SiPM receiver, and is configured to receive the electric pulse and output the electric pulse when the electric pulse is greater than the threshold of the SiPM receiver.

According to a preferred embodiment of the present disclosure, obtaining the intensity of the incident light by the control unit 303 comprises: counting pulses generated by the incident light that are greater than a current value, to obtain a count value of the incident light.

According to a preferred embodiment of the present disclosure, the laser radar has a plurality of detection angles or a plurality of detection orientations. Adjusting the threshold of the SiPM receiver by the control unit 303 comprises: adjusting the threshold of the SiPM receiver at a next detection angle by proportionating an adjustment amount to a difference between the count value of the incident light and an optimal count value. As illustrated in the formula 1 and formula 2 above, details are not described herein again.

According to a preferred embodiment of the present disclosure, the control unit 303 is configured to form a gray scale image according to the intensities of the incident light obtained by the plurality of SiPM receivers at the plurality of angles, where each pixel in the gray scale image corresponds to the intensity of the incident light obtained by one of the SiPM receivers at one of the angles.

According to a preferred embodiment of the present disclosure, the step of receiving the incident light at the current angle by the SiPM receiver is performed when the SiPM receiver is not ranging.

According to embodiments of the present disclosure, more noise is generated when the background light of the SiPM receiver or the laser radar is strong, and a threshold of a channel corresponding to a next scanning plane is to be increased. When the background light is weak, the threshold of the channel corresponding to the next scanning plane is to be decreased. In addition, the gray scale image is formed according to Noisecount of the above two SiPM units, as illustrated in FIG. 6. Finally, the plurality of channels can form a column of the gray scale image of a complete field of view. With the rotation of the laser radar, gray scale data can generate a diagram from one column, thereby generating a gray scale video synchronized with a rotation frequency.

The above descriptions are merely preferred embodiments of the present disclosure, but are not intended to limit the present disclosure. Any modification, equivalent replacement, and improvement made within the spirit and principle of the present disclosure shall fall within the protection scope of the present disclosure.

It should be finally noted that the foregoing descriptions are merely exemplary embodiments of the present disclosure, but are not intended to limit the present disclosure. Although the present disclosure has been described in detail with reference to the foregoing embodiments, for a person of ordinary skill in the art, modifications can be made to the technical solutions described in the foregoing embodiments, or equivalent replacements can be made to some technical features in the technical solutions.

What is claimed is:

1. A method for dynamically adjusting a threshold of a silicon photomultiplier (SiPM) receiver, comprising:
   receiving an incident light by the SiPM receiver;
   obtaining an intensity of the incident light; and
   adjusting a threshold of the SiPM receiver according to the intensity of the incident light; and
   forming a gray scale image according to intensities of the incident light obtained by a plurality of SiPM receivers at a plurality of angles, wherein each pixel in the gray scale image corresponds to the intensity of the incident light obtained by one of the plurality of SiPM receivers at one of the plurality of angles.

2. The method according to claim 1, wherein obtaining an intensity of the incident light comprises: counting, according to a current value of the threshold of the SiPM receiver, pulses generated by the incident light that are greater than the current value and obtaining a count value of the incident light for representing the intensity of the incident light.

3. The method according to claim 2, wherein adjusting the threshold of the SiPM receiver comprises: proportionating an adjustment amount to a difference between the count value of the incident light and an optimal count value.

4. The method according to claim 1, wherein the step of receiving the incident light at the current angle by the SiPM receiver is performed when the SiPM receiver is not ranging.

5. The method according to claim 1, further comprising: using the adjusted threshold as the threshold corresponding to the SiPM receiver at the next angle.

6. A method for dynamically adjusting a threshold of a laser radar, wherein the laser radar comprises a plurality of silicon photomultiplier (SiPM) receivers, the plurality of SiPM receivers are capable of sensing incident light at a plurality of angles, and the method comprises:
   receiving the incident light at a current angle by a SiPM receiver;
   obtaining an intensity of the incident light;
   adjusting a threshold of the SiPM receiver at a next angle according to the intensity of the incident light; and
   forming a gray scale image according to the intensities of the incident light obtained by the plurality of SiPM receivers at the plurality of angles, wherein each pixel in the gray scale image corresponds to the intensity of the incident light obtained by one of the SiPM receivers at one of the angles.

7. The method according to claim 6, wherein obtaining an intensity of the incident light comprises: counting pulses generated by the incident light that are greater than a current value by using the threshold of the SiPM receiver at the current angle, to obtain a count value of the incident light for representing the intensity of the incident light.

8. The method according to claim 7, wherein adjusting the threshold of the SiPM receiver at a next angle comprises: proportionating an adjustment amount to a difference between the count value of the incident light and an optimal count value.

9. The method according to claim 6, wherein the step of receiving the incident light at the current angle by the SiPM receiver is performed when the SiPM receiver is not ranging.

10. The method according to claim 6, further comprising: using the adjusted threshold as the threshold corresponding to the SiPM receiver at the next angle.

11. A laser radar, comprising:
    a plurality of silicon photomultiplier (SiPM) receivers, configured to receive an incident light and generate electric pulses, wherein each SiPM receiver has a corresponding threshold; and
    a control unit, coupled to the plurality of SiPM receivers, and configured to obtain an intensity of the incident light according to the electric pulses, adjust the threshold of the SiPM receiver according to the intensity of the incident light, and form a gray scale image according to the intensities of the incident light obtained by the plurality of SiPM receivers at a plurality of angles, wherein each pixel in the gray scale image corresponds to the intensity of the incident light obtained by one of the SiPM receivers at one of the plurality of angles.

12. The laser radar according to claim 11, wherein obtaining the intensity of the incident light by the control unit comprises: counting pulses generated by the incident light that are greater than a current value, to obtain a count value of the incident light for representing the intensity of the incident light.

13. The laser radar according to claim 12, wherein the laser radar has a plurality of detection angles, and adjusting the threshold of the SiPM receiver by the control unit comprises: adjusting the threshold of the SiPM receiver at a next detection angle by proportionating an adjustment amount to a difference between the count value of the incident light and an optimal count value.

14. The laser radar according to claim 11, wherein the incident light is received at current angle by the SiPM receiver when the SiPM receiver is not ranging.

* * * * *